J. Bosenbury,
Boring Wood.
N° 17,017.   Patented Apr. 14, 1857.
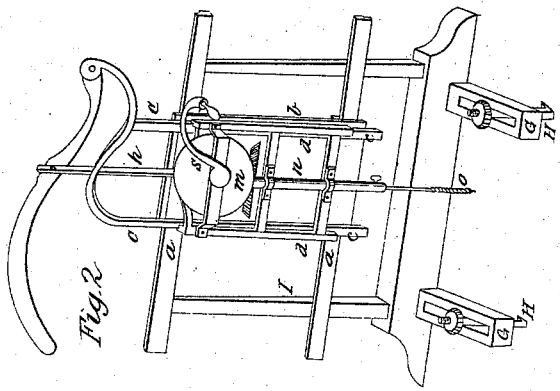
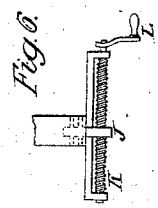
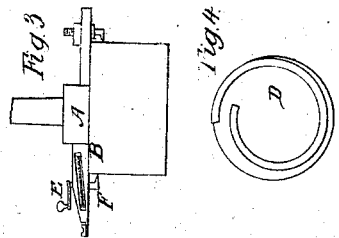
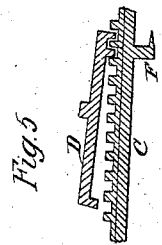
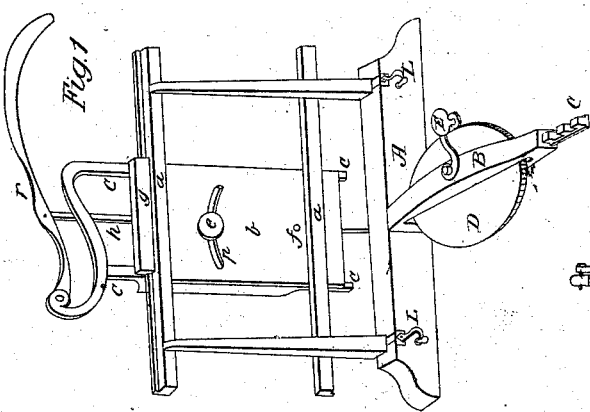
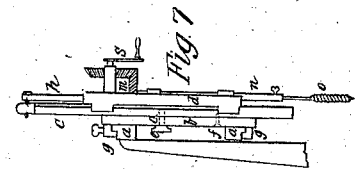
Witnesses
Wm M Gooding
A C Gooding
Inventor
Jonas Bosenbury

UNITED STATES PATENT OFFICE.

JONAS BOSENBURY, OF CHERRYVILLE, NEW JERSEY.

BORING-MACHINE.

Specification of Letters Patent No. 17,017, dated April 14, 1857.

*To all whom it may concern:*

Be it known that I, JONAS BOSENBURY, of the town of Cherryville, county of Hunterdon, State of New Jersey, have invented certain Improvements in Boring-Machines; and I do hereby declare that the following is a full and exact description thereof, reference being had to the accompanying drawings and to the letters of reference marked thereon.

The nature of my invention consists in rendering the parts of the machine adjustable to a degree of nicety hitherto unpracticed and in facilitating the withdrawal of the auger from the hole which has frequently to be done while timber is being bored.

To enable others skilled in the art to make and use my invention I proceed to describe the same.

Figure 1 is a back view and Fig. 2 is a front view of the machine.

A is the base of the frame work to which is attached on one side a longitudinal projection, B, in which is a cogged rack C and a flat spiral D which spiral is shown in Fig. 4 and sectionally in Fig. 5; this spiral is, as shown, moved by hand by the crank, E, and causes the rack C to advance or recede as required. On the under side of the rack C is affixed a dog or holder F which moves back and forth with the rack C. On the opposite side of the base A there are two projections, G, G, in which are slots quite through them for nearly their whole length; in each of these slots is placed a dog or holder H H with a shoulder below and a screw with a nut on the upper side to admit of the dogs being moved and set fast at any given place in the slotted projections. The object of this arrangement is shown in Fig. 3 where the base is represented as fastened in a given position on a stick of timber and is there held immovable by the dogs.

On the base A is a frame constructed of two uprights and two lateral slides as shown by I; the two uprights are held firmly to the base while at the same time they are left at liberty to be moved transversely by the nut J, Fig. 6, and the screw K, the nut being in the foot of the upright and the screw fast to the base A; to the screws are fixed the cranks L, Figs. 1 and 6. The object of this is to admit of the whole upper frame work being moved after the base is fastened to the timber by the dogs H, so as to bring the point of the auger to the exact distance from the edge of the timber which is required by the mortise.

A frame or a solid piece of plank as the case may be, shown at *b*, Figs. 2 and 7, has slides to move upon the laterals *a*; these slides are marked, *g*. To this is attached by the pin *f* another frame *c*, the sides of which form slides for the frame *d* which moves up and down thereon and carries the bevel wheels *m*, the shank *n* and the auger *o*, Figs. 2 and 7. The frame C, Figs. 2 and 7, is also held fast to the back frame or piece *b* by the screw *e*, a semicircular slot *p*, Fig. 1, in the back piece *b* allows the frame *c*, Fig. 7, to to be turned upon the pin *f* so as to incline the auger to any desired bevel for brace and other angle mortises, and the frame *c* is held securely in the desired position by the screw *e*.

A lever *r*, Figs. 1 and 2, works on a pin in a top cross piece of frame *c* and by the rod *h*, Figs. 1, 2 and 7, is attached to the carrier frame *d* by which the auger can be quickly withdrawn when required. Motion is communicated to the auger or bit by the crank *s* Figs. 2 and 7.

The peculiar advantages of the above mode of construction are, retention of the machine in any given spot leaving the operator's hands at liberty; bringing the point of the auger or bit laterally to the exact spot with ease and certainty and a gain of power by the lever in withdrawing an auger from deep holes in green and wet timber.

I claim—

The arrangement of devices as described, for the purposes set forth.

JONAS BOSENBURY.

Witnesses:
WM. M. GOODING,
A. G. GOODING.